(12) United States Patent
Chen

(10) Patent No.: US 11,557,857 B2
(45) Date of Patent: Jan. 17, 2023

(54) FIRST CONNECTOR, SECOND CONNECTOR AND ELECTRICALCONNECTOR ASSEMBLY

(71) Applicant: Molex, LLC, Lisle, IL (US)

(72) Inventor: Feng Chen, Shanghai (CN)

(73) Assignee: Molex, LLC, Lisle, IL (US)

( * ) Notice: Subject to any disclaimer, the term of this patent is extended or adjusted under 35 U.S.C. 154(b) by 95 days.

(21) Appl. No.: 16/775,275

(22) Filed: Jan. 29, 2020

(65) Prior Publication Data

US 2020/0251855 A1 Aug. 6, 2020

(30) Foreign Application Priority Data

Feb. 2, 2019 (CN) .......................... 201910106989.7

(51) Int. Cl.
*H01R 13/6581* (2011.01)
*H02K 11/40* (2016.01)
(Continued)

(52) U.S. Cl.
CPC ......... *H01R 13/6275* (2013.01); *H01R 13/50* (2013.01); *H01R 13/6581* (2013.01);
(Continued)

(58) Field of Classification Search
CPC ............... H01R 13/50; H01R 13/6275; H01R 13/6581; H01R 13/6282; H02K 5/225; H02K 11/40
See application file for complete search history.

(56) References Cited

U.S. PATENT DOCUMENTS

| 9,960,538 B2 * | 5/2018 | Nagasaki | ............. H01R 13/639 |
| 2019/0123482 A1 * | 4/2019 | Peng | .................... H01R 13/405 |

FOREIGN PATENT DOCUMENTS

| CN | 101911397 A | 12/2010 |
| CN | 103427233 A | 12/2013 |

(Continued)

OTHER PUBLICATIONS

Translation. Description. JP 2018045836A. Yamada Wataru. Connector. (Year: 2018).*

(Continued)

*Primary Examiner* — Vanessa Girardi
*Assistant Examiner* — Milagros Jeancharles

(57) ABSTRACT

A first connector, a second connector and an electrical connector assembly having the first connector and the second connector are provided. The first connector includes an insulating housing and a locking plate embedded in the insulating housing, and a plurality of first power terminals, a plurality of first signal terminals and a plurality of first braking terminals mounted in the insulating housing; the locking plate is provided with a locking mechanism protruding upwardly. The second connector includes a terminal block, a cover body covering the terminal block, a locking slidable cover slidably mounted on the cover body and a plurality of second power terminals, a plurality of second signal terminals and a plurality of second braking terminals mounted in the terminal block. The locking slidable cover is capable of sliding forwardly and rearwardly relative to the cover body, and is capable of being locked together with the locking mechanism. It is adapted to a servo motor, saves space and is easy to assemble.

9 Claims, 9 Drawing Sheets

(51) Int. Cl.
*H01R 13/627* (2006.01)
*H01R 13/50* (2006.01)
*H02K 5/22* (2006.01)

(52) U.S. Cl.
CPC ............ *H02K 5/225* (2013.01); *H02K 11/40* (2016.01); *H01R 2201/10* (2013.01)

(56) References Cited

FOREIGN PATENT DOCUMENTS

| | | |
|---|---|---|
| CN | 203983621 U | 12/2014 |
| CN | 105390872 A | 3/2016 |
| CN | 107240811 A | 10/2017 |
| CN | 207834743 U | 9/2018 |
| JP | 2018045836 A | 3/2018 |
| JP | 2018139175 A | 9/2018 |

OTHER PUBLICATIONS

Notification of Reasons for Refusal received for JP application No. 2020-012526, dated Mar. 23, 2021, 7 pages. 4 pages of English translation and 3 pages of official copy).

* cited by examiner

FIRST CONNECTOR, SECOND CONNECTOR AND ELECTRICALCONNECTOR ASSEMBLY

RELATED APPLICATIONS

This application claims priority to Chinese Application No. 201910106989.7 filed on Feb. 2, 2019, which is incorporated herein by reference in its entirety.

TECHNICAL FIELD

The present disclosure relates to the field of electrical connector, particularly relates to a first connector, a second connector and an electrical connector assembly including the first connector and the second connector, which are adapted to a servo motor and easy to assemble.

BACKGROUND

At present, the traditional servo motor on the market is generally provided with two connectors on a surface of the servo motor, one of the two connectors is used to realize the transmission function of power supply and braking, and the other of the two connectors provides the function of signal transmission. On this kind of servo motor, two connecting wires are needed to connect the servo motor and a driving equipment, which is complicated in assembling and the manufacturing cost is relatively high. Especially on a servo motor with a small size, it is difficult to assemble, and at the same time, it is also a great challenge to the structure design of the connector.

Chinese utility model patent application issuance publication No. CN207834743U discloses a fast-locking type connector, which includes a plug device, a receptacle device and a lock lever, wherein: the receptacle device is locked on the motor; the plug device is inserted on the receptacle device; the lock lever is mounted to an outer side of the plug device, and a barbed hook is provided on the lock lever, the lock lever can lock the receptacle device and the plug device through the barbed hook. The technical solution of the utility model patent application adopts the lock lever to realize the connection of the plug device and the receptacle device, saves the assembling time of the plug device and the receptacle device, and improves the assembling efficiency of a single connector. However, in this solution, only the power terminal and the braking terminal are integrated into one connector. For a servo motor, another connector is needed to provide signal transmission function, that is, two connectors need to be provided on the servo motor, which is cumbersome to assemble. At the same time, the plug device of the fast-locking type connector is locked together with the receptacle device by rotating of the lock lever, but in some applications with a compact space (such as when a space above the plug device is extremely narrow and cannot be used for the rotation of the lock lever), it is not suitable to use the above fast-locking type connector, so it needs to be further improved.

SUMMARY

The technical problem to be solved by the present disclosure is to overcome the shortcoming existing in the prior art mentioned above, and proposes a first connector, a second connector and an electrical connector assembly which are adapted to a servo motor and are easy to assemble.

According to a solution of the present disclosure, the present disclosure provides a first connector comprising: an insulating housing, the insulating housing is provided with a plurality of first power cavities and at least one first signal cavity which extend in an up-down direction; a plurality of first power terminals correspondingly extending into the plurality of first power cavities; a plurality of first signal terminals and a plurality of first braking terminals provided in the first signal cavity; a locking plate embedded in the insulating housing, the locking plate is provided with a locking mechanism protruding upwardly, the locking mechanism is exposed on an upper surface of the insulating housing, and the locking mechanism being used to be locked with a second connector correspondingly.

According to another solution of the present disclosure, the present disclosure further provides a second connector comprising: a terminal block provided with a plurality of second power cavities and a plurality of second signal cavities which extend in an up-down direction; a plurality of second power terminals correspondingly mounted in the plurality of second power cavities; a plurality of second signal terminals and a plurality of second braking terminals which are correspondingly mounted in the plurality of second signal cavities; a cover body covering the terminal block; a locking slidable cover slidably mounted on the cover body, the locking slidable cover is capable of sliding forwardly and rearwardly relative to the cover body, and is capable of being locked together with a first connector which is correspondingly mated with the second connector.

According to still another solution of the present disclosure, the present disclosure further provides an electrical connector assembly comprising the first connector as above and the second connector as above; wherein the locking slidable cover of the second connector and the locking mechanism of the first connector are correspondingly locked together; the second power terminals are electrically connected with the first power terminals correspondingly, the second signal terminals are electrically connected with the first signal terminals correspondingly, and the second braking terminals are electrically connected with the first braking terminal correspondingly.

Compared with the prior art, the present disclosure has at least the following advantages: the first connector and the second connector of the present disclosure each integrate the power terminals, the braking terminals and the signal terminals, only one electrical connector component including the first connector and the second connector needs to be mounted on the servo motor, which simplifies the connection of the cable and assembling, reduces costs, saves space and is more convenient to use. At the same time, the first connector is provided with the locking mechanism protruding upwardly, and the second connector is provided with the locking slidable cover, and by that the locking slidable cover slides forwardly and rearwardly to engage the locking mechanism and be locked, locking, assembling and disassembling of the first connector and the second connector are all convenient and fast, which improves the assembling efficiency and the convenience of use, and the assembling and disassembling structure which slides forwardly and rearwardly has a very low requirement on a space above the second connector, is especially suitable for the application environment with very compact space.

DETAILED DESCRIPTION OF PREFERRED EMBODIMENTS

While the present disclosure may be susceptible to embodiments in different forms, there are shown in the figures, and will be described herein in detail, are only specific embodiments, with the understanding that the present disclosure is to be considered as an exemplification of the principles of the present disclosure, and is not intended to limit the present disclosure to that as illustrated.

As such, references to a feature are intended to describe a feature of an embodiment of the present disclosure, not to imply that every embodiment thereof must have the described feature. Furthermore, it should be noted that the description describes a number of features. While certain features may be combined together to illustrate potential system designs, those features may also be used in other combinations not expressly described. Thus, the described combinations are not intended to be limiting, unless otherwise noted.

In the embodiments illustrated in the figures, expressions for indicating directions such as up, down, left, right, front and rear, are used to explain the structure and movement of the various components of the present disclosure, are not absolute, but relative. These descriptions are appropriate when the components are in the position shown in the figures. If the description of the position of the components changes, these expressions for indicating directions are also changed correspondingly.

Hereinafter, an embodiment of the present disclosure is further described in detail in combination with the drawings of the present disclosure.

Figure 1:
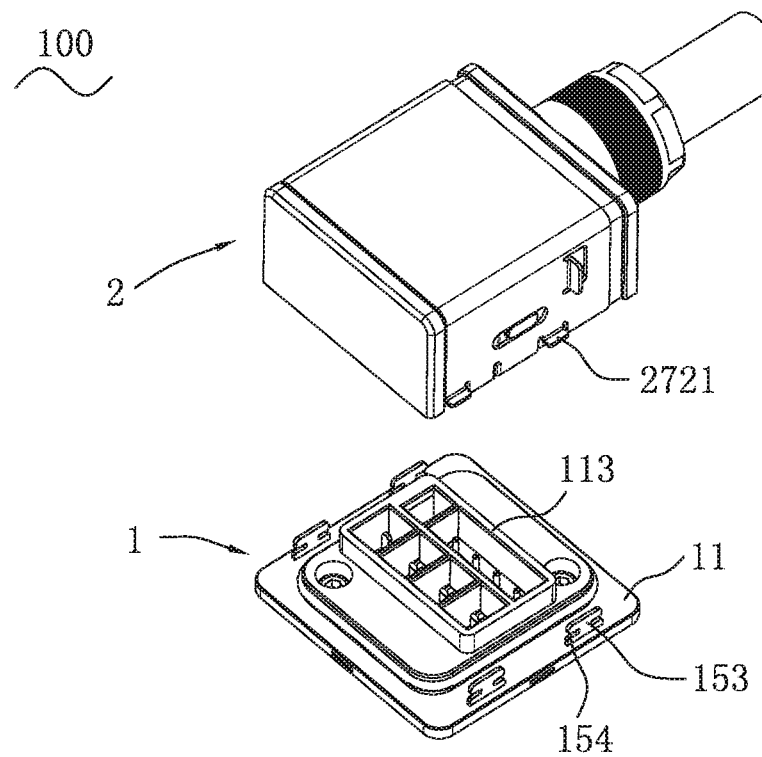
FIG. 1 and FIG. 2 are exploded perspective views of an embodiment of an electrical connector assembly of the present disclosure from two different angles.
Figure 2:
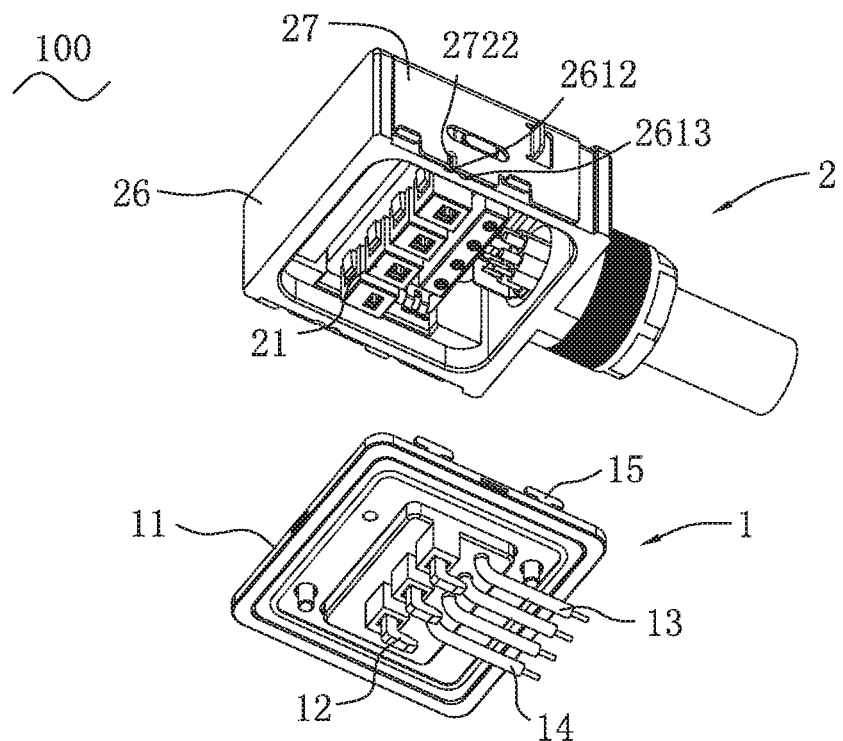
Figure 3:
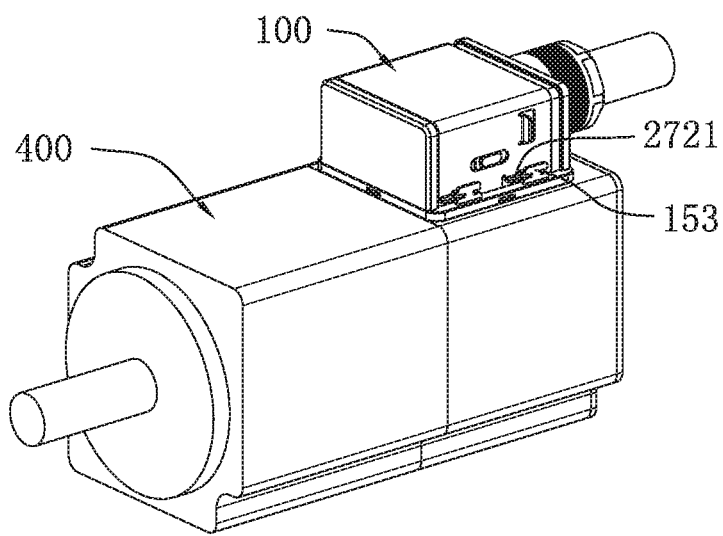
FIG. 3 is a perspective view of a servo motor having the electrical connector assembly of FIG. 1.
Figure 4:
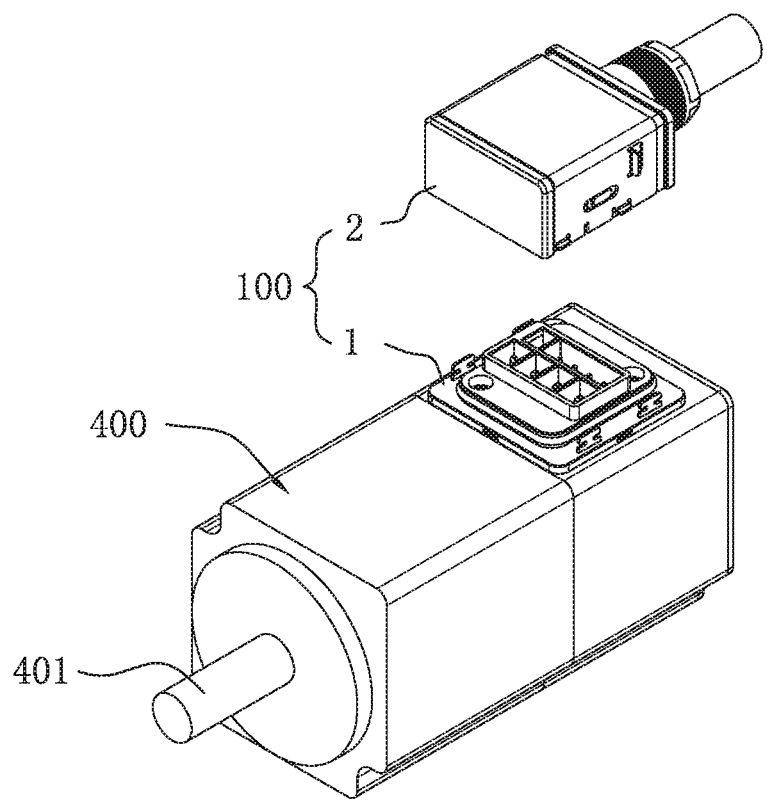
FIG. 4 is an exploded perspective view of FIG. 3.

Referring to FIG. 1 and FIG. 2, an electrical connector assembly 100 of the embodiment includes a first connector 1 and a second connector 2 which is matched with the first connector 1. As shown in FIG. 3 and FIG. 4, the electrical connector assembly 100 is used in a servo motor, when used, the first connector 1 is mounted on a motor body 400 of the servo motor, and then the second connector 2 and the first connector 1 are mated with each other and fixed together.

For convenient description a direction that the first connector 1 and the second connector 2 make an end thereof close to the motor body 400 in use is defined as "down" and a direction away from the "down" end is defined as "up". In addition, an extending direction of a motor shaft 401 in the motor body 400 is "front", and a direction away from the "front" is defined as "rear".

Figure 5:
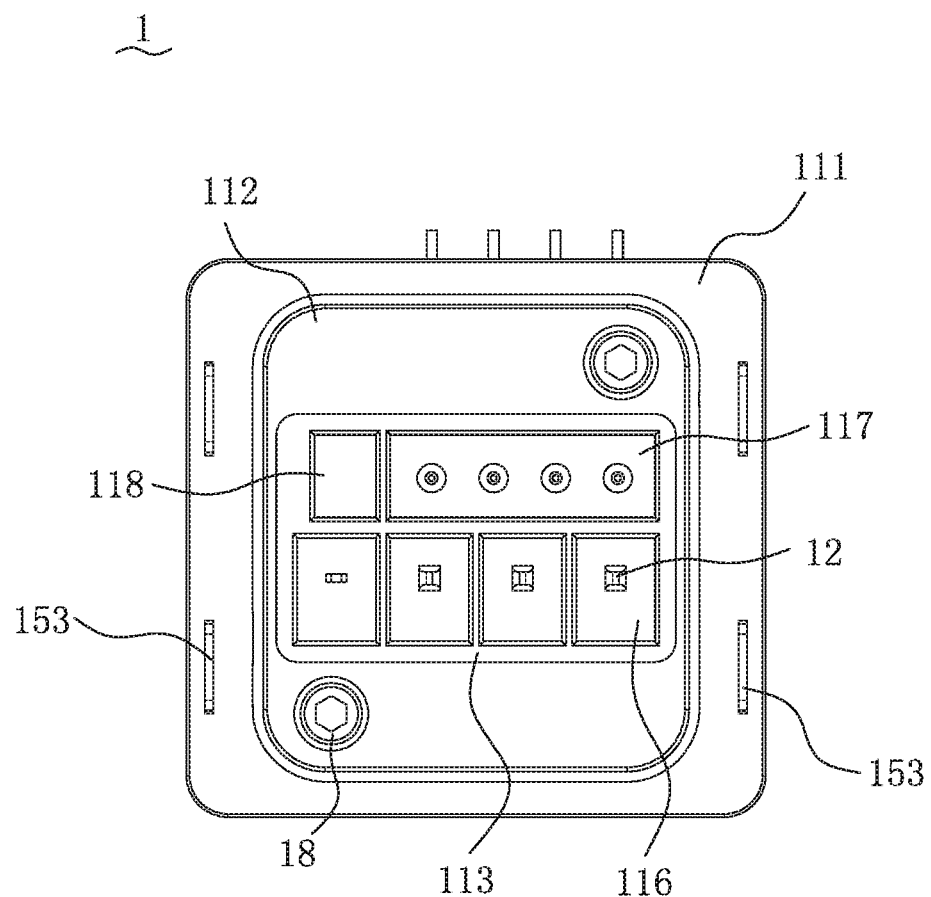
FIG. 5 is a top view of the first connector of FIG. 1.
Figure 6:
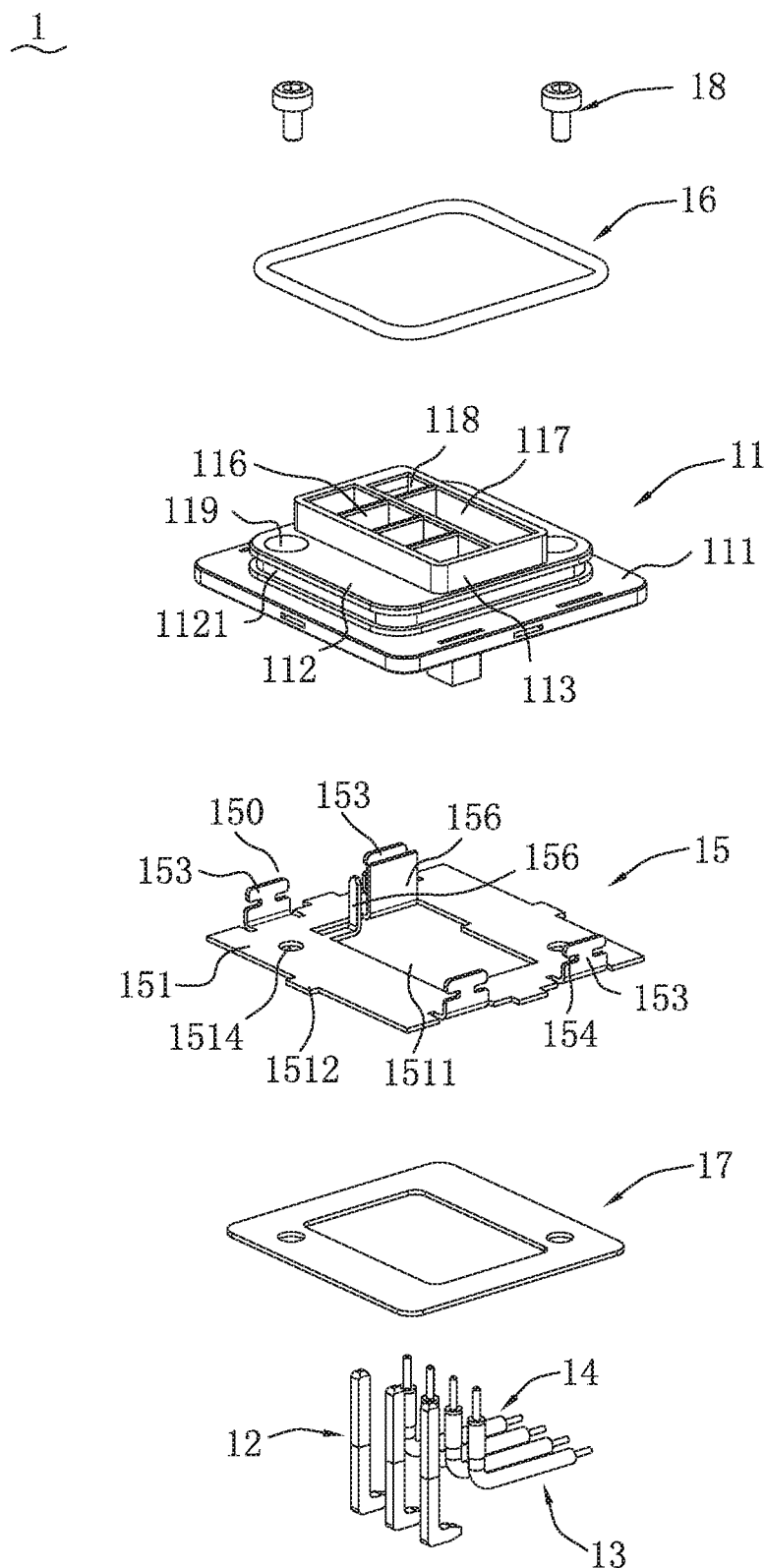
FIG. 6 and FIG. 7 are exploded perspective views of the first connector of FIG. 1 from two different angles.
Figure 7:
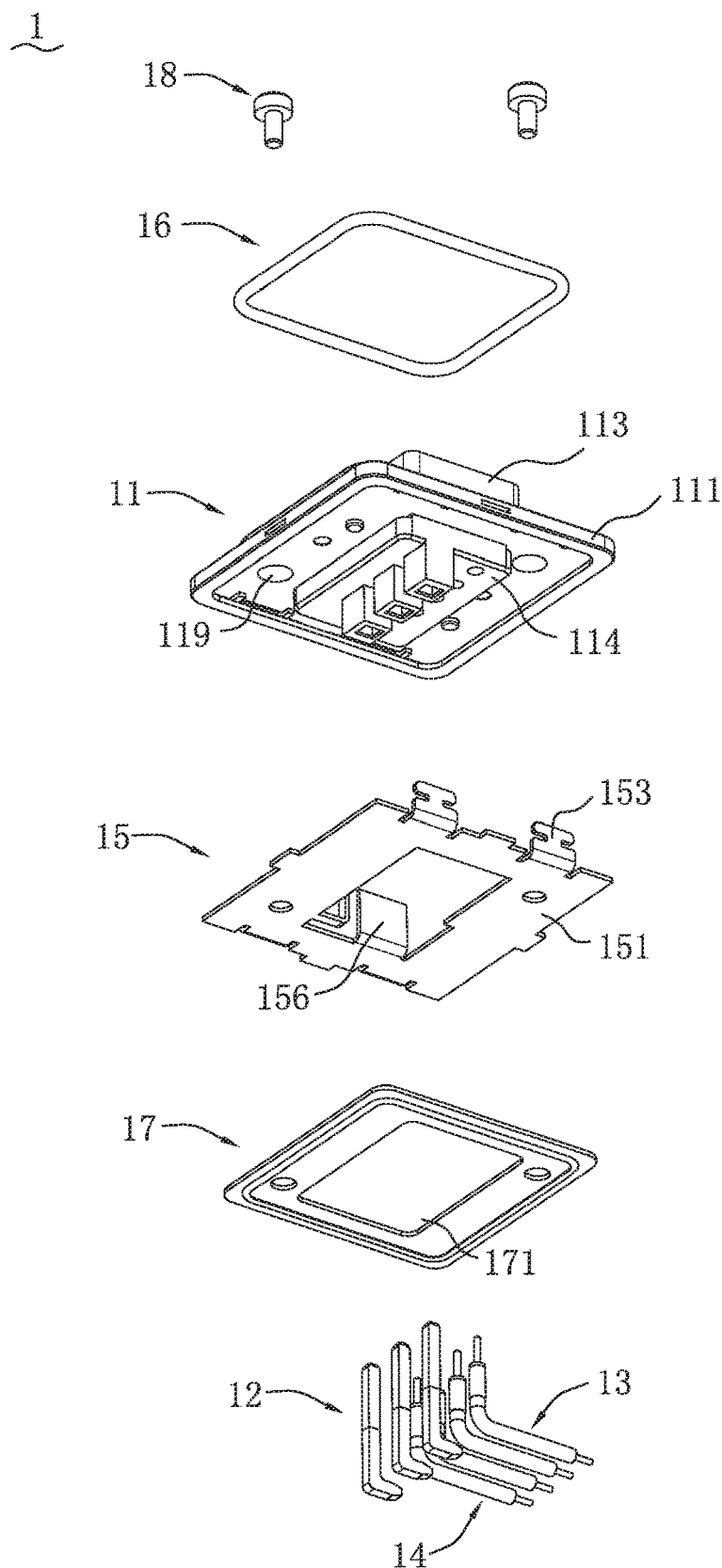
Figure 8:
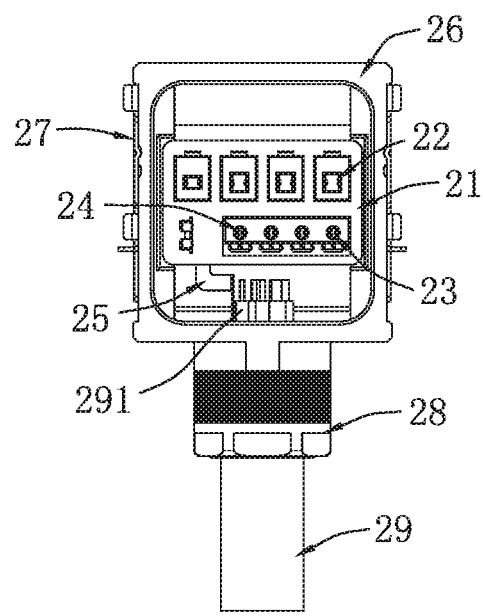
FIG. 8 is a bottom view of the second connector of FIG. 1.

Referring to FIG. 5 to FIG. 7, in the embodiment, the first connector 1 includes an insulating housing 11, a locking plate 15, a plurality of first power terminals 12, a plurality of first signal terminals 13 and a plurality of first braking terminals 14, a waterproof ring 16 and a waterproof sheet 17. The first connector 1 is further provided with two screws 18 which are used to connect and fix with the motor body 400.

Referring to FIG. 6 and FIG. 7 together, the insulating housing 11 includes a base portion 111, a mating portion 112 protruding upwardly from an upper surface of the base portion 111, an upper protruding portion 113 further protruding upwardly from the mating portion 112, and a lower protruding portion 114 protruding downwardly from a lower surface of the base portion 111. The insulating housing 11 is preferably integrally formed by injection molding an insulating material.

As shown in FIG. 6, the base portion 111 has a rectangular plate shape of which a length and a width are substantially the same. The mating portion 112 also has a rectangular body shape of which a length and a width are substantially the same, a cross section of the mating portion 112 is smaller than a cross section of the base portion 111, and the mating portion 112 is arranged substantially concentrically with the base portion 111; a stepped structure is formed between a periphery of the mating portion 112 and the base portion 111. The mating portion 112 is used to mate with the second connector 2, and an outer circumferential surface of the mating portion 112 is provided with an encircling receiving groove 1121 to receive the waterproof ring 16, so as to realize the waterproof sealing between the first connector 1 and the second connector 2.

The upper protruding portion 113 has a rectangular body shape, a left side surface and a right side surface of the upper protruding portion 113 are respectively close to a left side surface and a right side surface of the mating portion 112, a front side surface and a rear side surface of the upper protruding portion 113 are spaced apart from a front side surface and a rear side surface of the mating portion 112 respectively, so the front side surface of the upper protruding portion 113 and the mating portion 112 form a step structure, and the rear side surface of the upper protruding portion 113 and the mating portion 112 form a step structure. The upper surface of the mating portion 112 is provided with a mounting hole 119 in front of the upper protruding portion 113, and the upper surface of the mating portion 112 is provided with a mounting hole 119 in rear of the upper protruding portion 113. Together referring to FIG. 7, the mounting hole 119 penetrates downwardly the lower surface of the base portion 111 and is used to allow the screw 18 to fix.

As shown in FIG. 7, a step is formed between the lower protruding portion 114 and the base portion 111, and the lower protruding portion 114 and the upper protruding portion 113 are opposite in an up-down direction. When the first connector 1 is mounted to the motor body 400, the lower protruding portion 114 extends into the motor body 400. The waterproof sheet 17 has a center hole 171 allowing the waterproof sheet 17 to sheathe an outer circumference of the lower protruding portion 114 and attach below the insulating housing 11 so as to realize the waterproof sealing between the first connector 1 and the motor body 400.

Together referring to FIG. 6 and FIG. 7, a plurality of first power cavity 116, a first signal cavity 117 and a first ground cavity 118 are formed on the insulating housing 11. The plurality of first power cavities 116 extend downwardly from an upper surface of the upper protruding portion 113 and extend beyond the lower protruding portion 114, and the plurality of first power cavities 116 are arranged along a long side on a front side of the upper protruding portion 113. The first signal cavity 117 and the first ground cavity 118 are arranged along a long side on a rear side of the upper protruding portion 113.

Together referring to FIG. 1, FIG. 2 and FIG. 5 again, the plurality of first power terminals 12 are fixedly mounted on the insulating housing 11. An upper end of each first power terminal 12 correspondingly extends into one of the plurality of first power cavities 116 for electrical connection with the second connector 2. A tail end of each first power terminal 12 extends downwardly beyond the insulating housing 11 and extends rearwardly for electrical connection with the motor body 400.

The plurality of first signal terminals 13 and the plurality of first braking terminal 14 are fixedly mounted on the insulating housing 11. An upper end of each first signal terminal 13 and an upper end of each first braking terminal 14 extend into the first signal cavity 117 for electrical connection with the second connector 2; the plurality of first signal terminals 13 and the plurality of first braking terminals 14 are spaced apart from each other and arranged along the length direction of the first signal cavity 117. A lower end of each first signal terminal 13 and a lower end of each first braking terminal 14 also extend downwardly beyond the insulating housing 11 and extend rearwardly for electrical connection with the motor body 400.

In the embodiment, the number of the first power cavities 116 is four, and the number of the first power terminals 12 is three. The first power cavity 116 positioned at an outermost side does not accommodate the first power terminal 12 but is used for grounding. The number of the first signal terminals 13 is two, and the number of the first braking terminals 14 is two.

Referring to FIG. 6 and FIG. 7, the locking plate 15 is made of a metal material, and is preferably fixed with the insulating housing 11 by an insert molding process as an integral structure, so as to enhance the structural strength of the insulating housing 11. The locking plate 15 includes a body 151, four hooks 153 bent upwardly from the body 151 and two first grounding terminals 156.

The body 151 has a flat plate shape, and is provided with an opening 1511 which is substantially rectangular shape in a middle thereof. The body 151 is fixed with the base portion 111 of the insulating housing 11 together and the opening 1511 can allow the lower protruding portion 114 to pass through. The body 151 of the locking plate 15 is provided with a through hole 1514 aligned with the mounting hole 119 so as to allow the screw 18 to pass through and firmly lock and fix the locking plate 15 to the motor body 400. A lug 1512 protrudes outwardly from each side of the body 151, the lug 1512 extends toward a corresponding side surface of the base portion 111. An end surface of the lug 1512 is substantially flush with the corresponding side surface of the base portion 111. The lug 1512 can improve the engagement strength of the locking plate 15 and the insulating housing 11.

The two first grounding terminals 156 are bent upwardly from a side wall of the opening 1511 of the body 151; in the two first grounding terminals 156, one first grounding terminal 156 with a larger width extends into the first ground cavity 118 of the insulating housing 11 and the other first grounding terminal 156 with a narrower width extends into the corresponding first power cavity 116 of the insulating housing 11. The first grounding terminal 156 is integrally bent from the locking plate 15. As the locking plate 15 and the insulating housing 11 form an integral structure, the strength is high and the number of terminals can be reduced, which is convenient to assemble.

The hooks 153 are bent upwardly from the left and right side edges of the body 151, and each of the left and right side edges of the body 151 is bent to form two hooks 153 spaced apart from each other in a front-rear direction. Each hook 153 is formed with a locking groove 154 extends forwardly and rearwardly with an opening facing forwardly. In the embodiment, the hook 153 is substantially in a shape of "H" which is rotated by 90 degrees, and a notch on the left side of the "H" shape which is rotated by 90 degrees corresponds to the locking groove 154.

As shown in FIG. 5, there is a spacing between the hook 153 and the corresponding side surface of the mating portion 112 of the insulating housing 11, and the spacing allows the second connector 2 to be mounted. The four hooks 153 are combined to form a locking mechanism 150 which is used to cooperate with the second connector 2 for locking. It is worth mentioning that the number of the hooks 153 in the embodiment is four, and in some embodiments not shown, the number of hooks 153 can also be reduced to two (that is, each side of the main body 151 is provided with one hook 153).

An assembling process of the first connector 1 is substantially as follows: the insulating housing 11 is injection molded on the locking plate 15 through an insert molding process, the first power terminals 12, the first signal terminals 13 and the first braking terminals 14 are mounted on the insulating housing 11 respectively, the waterproof ring 16 sheathes the outer circumference of the mating portion 112 of the insulating housing 11, the waterproof sheet 17 sheathes the lower protruding portion 114 of the insulating housing 11, finally the first connector 1 is mounted onto the motor body 400, lower ends of the first power terminals 12, the lower ends of the first signal terminals 13 and the lower ends of the first braking terminals 14 are connect to a circuit board (not shown) in the motor body 400 by wires or are directly welded to the circuit board in the motor body 400, and finally the first connector 1 as whole is fixed onto the motor body 400 by the screws 18.

Referring to FIG. 8 to FIG. 12, the second connector 2 mainly includes a terminal block 21, a cover body 26, a locking slidable cover 27, a cable 29, a sealing cap 28, a second grounding terminal 25, a plurality of second power terminal 22, a plurality of second signal terminals 23 and a plurality of second braking terminals 24.

Figure 12:
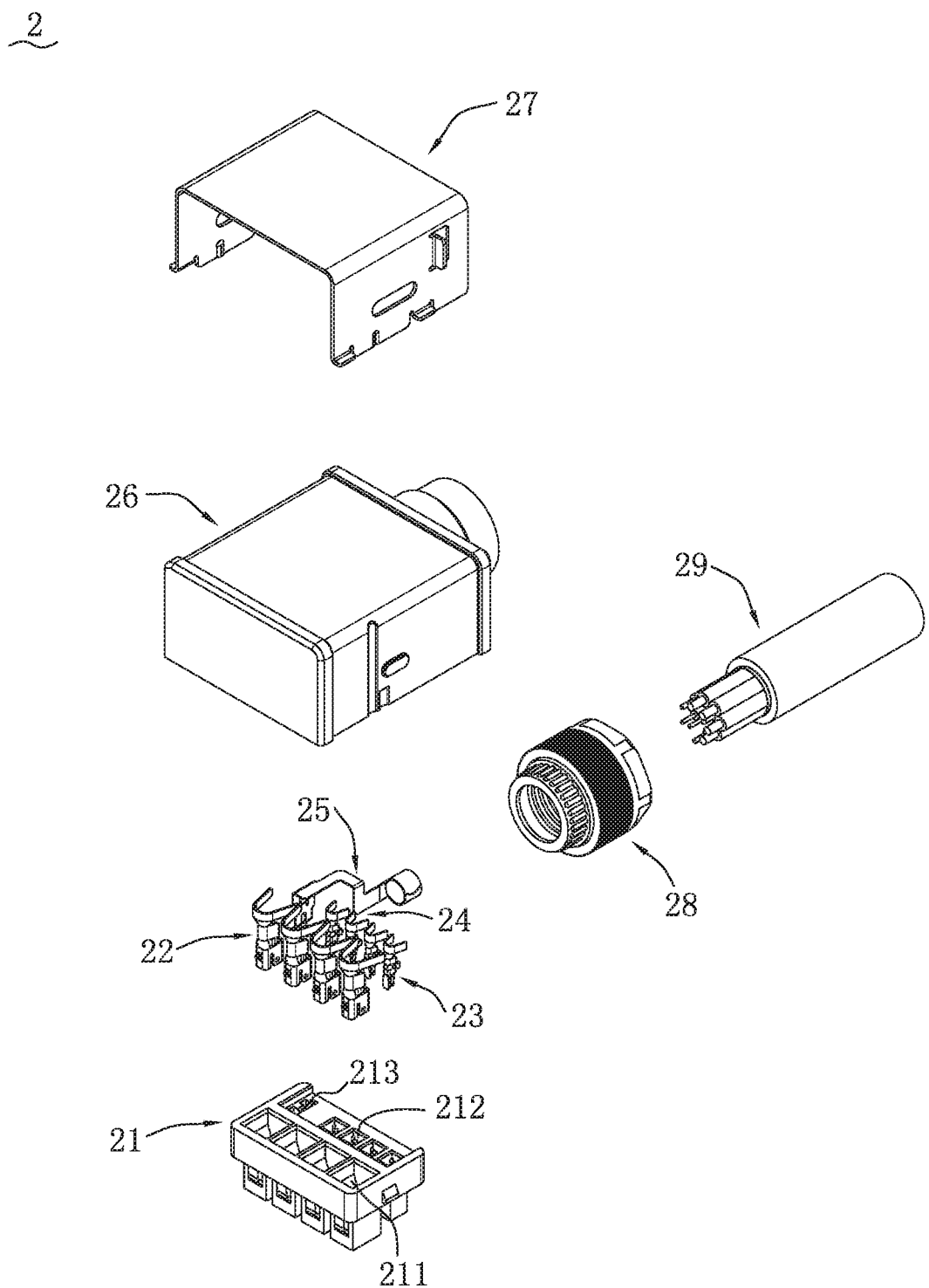
FIG. 12 is an exploded perspective view further exploded on the basis of FIG. 11.

As shown in FIG. 12, the terminal block 21 is provided with four second power cavities 211, four second signal cavities 212 and a second ground cavity 213. The four second power cavities 211 are arranged side by side along a length direction of the terminal block 21. The four second signal cavities 212 and the second ground cavity 213 are arranged along the length direction of the terminal block 21 and are arranged adjacent to a rear side of the four second power cavities 211.

Figure 10:
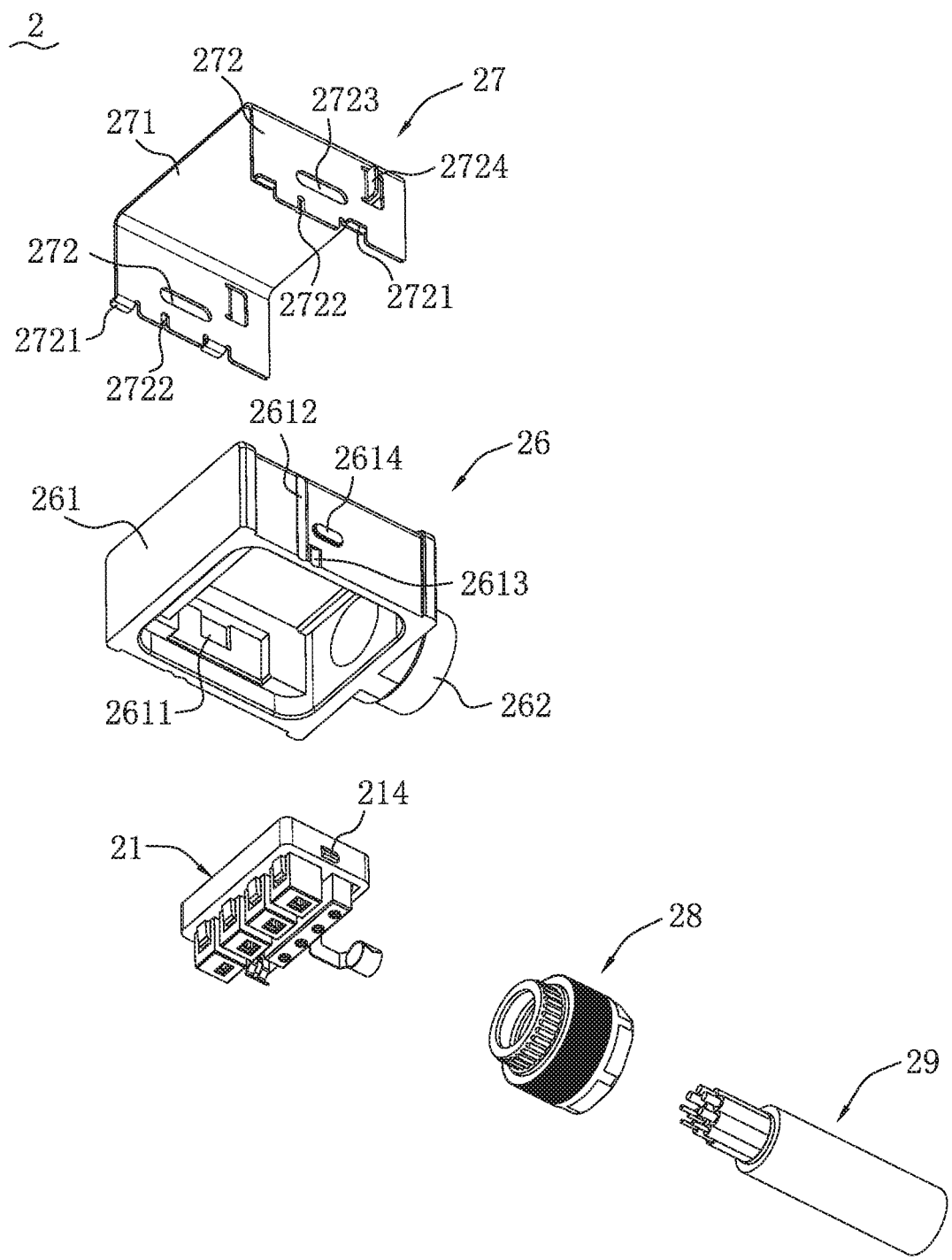
FIG. 10 and FIG. 11 are exploded perspective views further exploded on the basis of FIG. 9 from two different angles.
Figure 11:
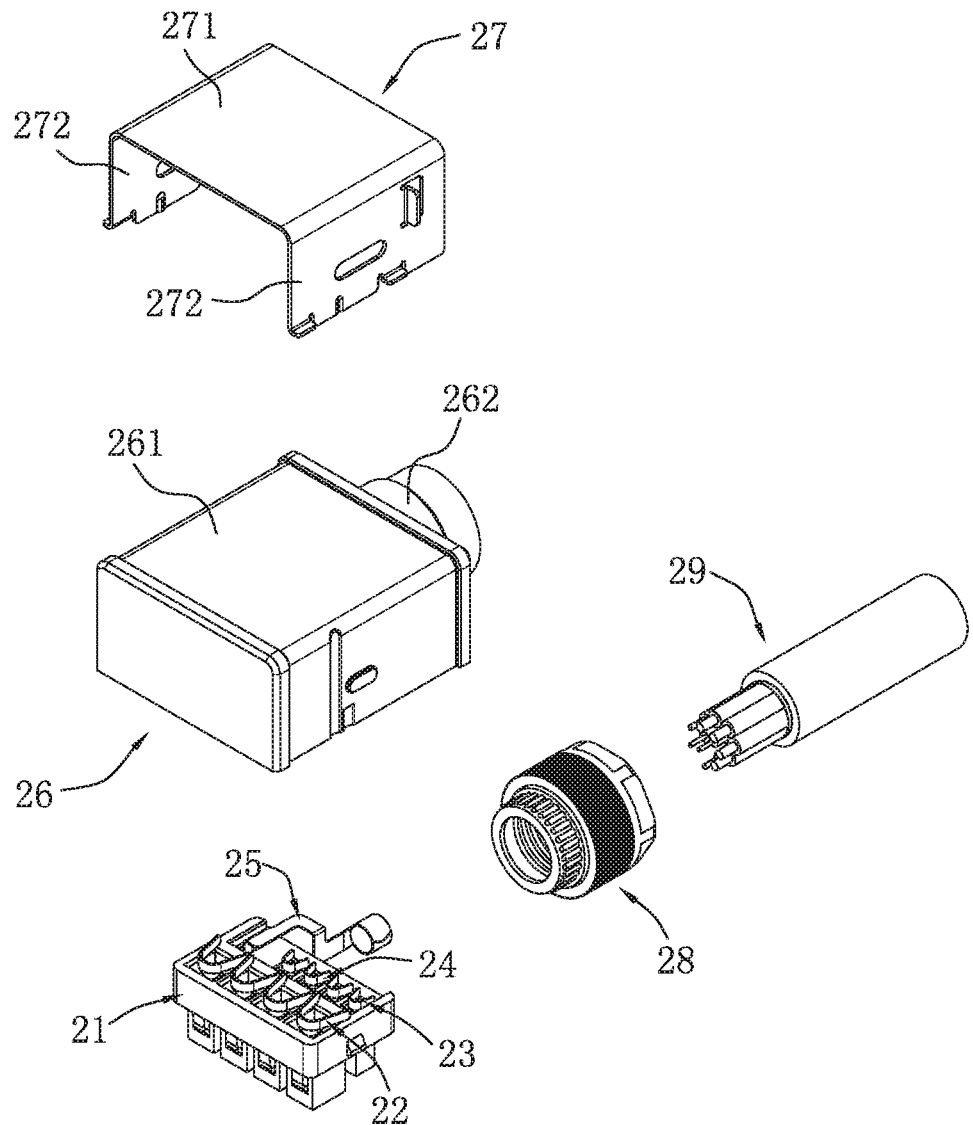

Referring to FIG. 10 to FIG. 12 together, the number of the second power terminals 22 is correspondingly four, the four second power terminals 22 are mounted in the four second power cavities 211 by one to one, and one of the second power terminals 22 is used to connect a ground line of a power supply. The number of the second signal terminals 23 and the number of the second braking terminals 24 each are two, the two second signal terminals 23 and the two second braking terminals 24 are mounted in the four second signal cavities 212 by one to one. A front end of the second grounding terminal 25 is mounted in the second ground cavity 213 and a rear end of the second grounding terminal 25 extends rearwardly out of the second ground cavity 213.

Referring to FIG. 10, the cover body 26 includes a main body 261 and a wire passing portion 262 extending rearwardly from a rear side of the main body 261. The main body 261 is a rectangular structure opened at a lower end and hollow in an interior to have a receiving cavity, so that the main body 261 can cover the terminal block 21 to receive the terminal block 21 and the terminals 22, 23, 24, and 25 mounted on the terminal block 21 therein. The wire passing portion 262 has a shape of hollow cylinder and is communicated with the interior of the main body 261. The cover body 26 is preferably formed integrally by injection molding a plastic.

Preferably, inner surfaces of two side walls of the main body 261 each are provided with a latching groove 2611, and two sides of the terminal block 21 each are provided with a latching protrusion 214 protruding outwardly, and the latching protrusion 214 can latch in the latching groove 2611, so as to fix the terminal block 21 in the main body 261.

Outer surfaces of the two side walls of the main body 261A each are further provided with a guiding groove 2612 recessed inwardly and a locking groove 2613 recessed inwardly. The guiding groove 2612 and the locking groove 2613 both extend in an up-down direction of the main body 261, the guiding groove 2612 penetrates an upper surface and a lower surface of the main body 261, a lower end of the locking groove 2613 penetrates to the lower surface of the main body 261 and an upper end of the locking groove 2613 is closed. The guiding groove 2612 is positioned at a distance in front of the locking groove 2613.

The outer surfaces of the two side walls of the main body 261 each are further provided with a limiting protrusion 2614 protruding outwardly. The limiting protrusion 2614 has an elongated shape and extends along in the front-rear direction. The limiting protrusion 2614 is positioned above the locking groove 2613.

Still referring to FIG. 10, the locking slidable cover 27 includes a top plate 271 and two side plates 272 bent downwardly from two sides of the top plate 271. The locking slidable cover 27 is preferably formed integrally by bending a metal. The locking slidable cover 27 is used as a shielding cover to provide a shielding function, and is also used to realize the locking function in cooperation with the first connector 1.

A lower end of each side plate 272 bends outwardly to form two locking tabs 2721 spaced apart from each other in the front-rear direction; each locking tab 2721 is parallel to the top plate 271 and extends horizontally in the front-rear direction. A lower end of each side plate 272 is further provided with a locking protrusion 2722 which protrudes toward the other side plate 272 and positioned between the two snap protruding sheets 2721, the locking protrusion 2722 can be formed by punching inwardly an outer surface of the side plate 272; the locking protrusion 2722 extends an up-down direction of the side plate 272, a height of the locking protrusion 2722 matches with a height of the locking groove 2613 on the main body 261. The side plate 272 is further provided with a limiting hole 2723 above the locking protrusion 2722. The limiting hole 2723 has an elongated shape and extends horizontally in the front-rear direction. In addition, the side plate 272 is further provided with an actuating portion 2724 bent outwardly. The actuating portion 2724 extends in the up-down direction and is perpendicular to the top plate 271. The actuating portion 2724 can be formed by punching out a broken slit on the side plate 272 and then bending outwardly the side plate 272 from the broken slit.

Figure 9:
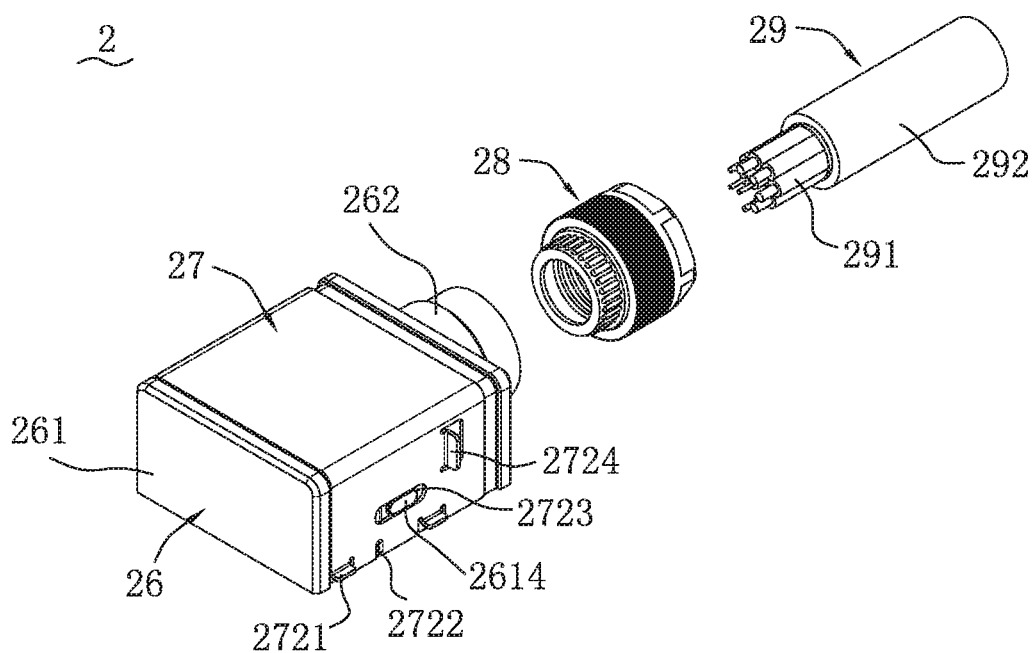
FIG. 9 is an exploded perspective view of the second connector of FIG. 1.

Referring to FIG. 9 and FIG. 10 together, the locking slidable cover 27 is mounted on the cover body 26, the top plate 271 covers the upper surface of the main body 261, and the side plate 272 attaches on the outer side surface of the main body 261. When assembled, the locking protrusion 2722 can move up and down along the guiding groove 2612 of the main body 261, so that the locking slidable cover 27 can cover the cover body 26 from up to down. After assembled, the limiting protrusion 2614 is positioned in the limiting hole 2723 and can limit a range of movement of the locking slidable cover 27 in the front-rear direction. The cooperation of the limiting protrusion 2614 and the limiting hole 2723 prevents the locking slidable cover 27 and the cover body 26 from being separated from each other in the up-down direction, but allows the locking slidable cover 27 to move in the front-rear direction within a certain range relative to the cover body 26.

The guiding groove 2612 and the locking groove 2613 on the cover body 26 limit front and rear sliding positions of the locking slidable cover 27. A cross section of the guiding groove 2612 and a cross section of the locking groove 2613 each are circular arc shape recessed inwardly, such a structural design is beneficial to prevent the improper sliding of the locking protrusion 2722. Specifically, when the locking slidable cover 27 is positioned at a front extreme position, the locking protrusion 2722 is adaptively received in the guiding groove 2612; when the locking slidable cover 27 is positioned at a rear extreme position, the locking protrusion 2722 is adaptively received in the locking groove 2613. Since both the guiding groove 2612 and the locking groove 2613 are recessed inwardly relative to the outer surface of the main body 261, both the guiding groove 2612 and the locking groove 2613 can be well receive the locking protrusion 2722, and sufficient retaining force is generated to maintain the position of the locking slidable cover 27, which is not easily affected by improper external forces to cause accidental unlocking.

When the front and rear positions of the locking slidable cover 27 need to be changed, the locking slidable cover 27 can be actuated by pushing and pulling the actuating portion 2724 to slide forwardly and rearwardly, which is convenient for operation.

Referring again to FIG. 8 and FIG. 9, the cable 29 includes a plurality of wires 291 and a jacket 292 covering the plurality of wires 291. Ends of the plurality of wires 291 extend forwardly out of the jacket 292 and extend into the main body 261 through the wire passing portion 262 of the cover body 26. The plurality of wires 291 are respectively used for power transmission and signal transmission, and are electrically connected with the second power terminals 22, the second signal terminals 23 and the second braking terminals 24 respectively specific connection relationships are omitted in the figure). The rear end of the second grounding terminal 25 wraps a ground wire of the cable 29 for grounding. The sealing cap 28 sheathes an outer circumference of the wire passing portion 262 and forms a protection for the cable 29.

An assembling process of the second connector 2 is substantially as follows: the second power terminals 22, the second signal terminals 23, the second braking terminals 24 and the second grounding terminal 25 are mounted into the terminal block 21 respectively, the front end of the cable 29 passes through the wire passing portion 262 of the cover body 26, and the wires 291 of the cable 29 are correspondingly connected with the terminals 22, 23, 24 and 25, the terminal block 21 is mounted into the main body 261 of the cover body 26 and fixed, the cable 29 is organized and then the sealing cap 28 is fixed on the wire passing portion 262, finally the locking slidable cover 27 is mounted on the cover body 26.

Combined with the description of the first connector 1 described above, and referring back to FIG. 1 to FIG. 4, the first connector 1 is first fixedly mounted on the motor body 400, and then the second connector 2 is inserted and mounted on the first connector 1, the cover body 26 of the second connector 2 covers the first connector 1, and the lower end of the terminal block 21 of the second connector 2 is inserted into the upper protruding portion 113 of the first connector 1, so that the second power terminals 22 are correspondingly electrically connected with the first power terminals 12 and one of the first grounding terminals 156, the second signal terminals 23 are electrically connected with the first signal terminals 13 correspondingly, the second braking terminals 24 are electrically connected with the first braking terminals 14 correspondingly, and the second grounding terminal 25 is electrically connected with the other of the first grounding terminals 156 (the corresponding relationship of each terminal can refer to FIG. 6 and FIG. 12).

In the initial status, the locking slidable cover 27 of the second connector 2 is positioned at the front extreme position, that is, the locking protrusion 2722 of the locking slidable cover 27 is received in the guiding groove 2612 of the cover body 26. At this time, the locking tab 2721 of the locking slidable cover 27 is separated from the hook 153 of the locking plate 15 of the first connector 1. The locking slidable cover 27 is pushed rearwardly to the rear extreme position, and the locking tab 2721 will horizontally rearwardly move and enter into the locking groove 154 of the hook 153 to be locked, so that the first connector 1 and the second connector 2 are locked together, the second connector 2 can't be detached upwardly from the first connector 1. At this time, the locking protrusion 2722 will be received in the locking groove 2613, preventing the locking slidable cover 27 from sliding reversely (i.e. forwardly), so that the locking slidable cover 27 can be kept in the locked status, and the locking slidable cover 27 is not easy to accidentally unlock due to the influence of an external force.

According to the above embodiment, the present disclosure integrates the power terminals, the braking terminals, and the signal terminals of the servo motor on one electrical connector assembly 100, only one electrical connector assembly 100 needs to be mounted on the servo motor, which simplifies the connection of the cable and assembling, reduces costs, and saves the space and is more convenient to use. At the same time, the first connector 1 is provided with the locking mechanism 150 protruding upwardly, and the second connector 2 is provided with the locking slidable cover 27, by that the locking slidable cover 27 slides forwardly and rearwardly, the locking slidable cover 27 engages with the locking mechanism 150 and is locked, the locking or unlocking of the first connector 1 and the second connector 2 can be realized, the assembling and disassembling are convenient and quick, which is suitable for the application environment with very compact space, and improves the assembling efficiency and convenience of use.

The above described contents are only the embodiments of the present disclosure, which cannot limit the implementing solutions of the present disclosure, those skilled in the art may conveniently make corresponding variation or modification based on the main concept and spirit of the present disclosure, therefore the extent of protection of the present disclosure shall be determined by terms of the claims.

What is claimed is:

1. A first connector comprising:
   an insulating housing, the insulating housing being provided with a plurality of first power cavities and at least one first signal cavity which extend in an up-down direction;
   a plurality of first power terminals correspondingly extending into the plurality of first power cavities;
   a plurality of first signal terminals and a plurality of first braking terminals provided in the first signal cavity; and
   a locking plate embedded in the insulating housing, the locking plate being made of a metal material, the locking plate including a body, a locking mechanism and at least one grounding terminal, the locking mechanism protruding upwardly from the body, the body having a flat plate shape and being provided with an opening, the at least one grounding terminal being bent upwardly from a side wall of the opening of the body, the locking mechanism being exposed on an upper surface of the insulating housing, and the locking mechanism being used to be locked with a second connector correspondingly.

2. The first connector according to claim 1, wherein the at least one grounding terminal extends into one of the first power cavities of the insulating housing.

3. The first connector according to claim 1, wherein the locking mechanism is in a form of at least two hooks bent upwardly from the locking plate, each hook has a locking groove extending along a front-rear direction.

4. The first connector according to claim 3, wherein
   the insulating housing comprises a base portion and a mating portion protruding upwardly from the base portion;
   the locking plate is embedded in the base portion;
   the at least two hooks protrude upwardly from an upper surface of the base portion and are positioned on two sides of the mating portion respectively.

5. The first connector according to claim 4, wherein the insulating housing is provided with at least one mounting hole to allow a screw to lock therein, and the locking plate is also provided with a through hole aligned with the mounting hole.

6. A second connector comprising:
   a terminal block provided with a plurality of second power cavities and a plurality of second signal cavities which extend in an up-down direction;
   a plurality of second power terminals correspondingly mounted in the plurality of second power cavities;
   a plurality of second signal terminals and a plurality of second braking terminals which are correspondingly mounted in the plurality of second signal cavities;
   a cover body covering the terminal block; and
   a locking slidable cover slidably mounted on the cover body, the locking slidable cover being capable of sliding forwardly and rearwardly relative to the cover body, and being capable of being locked together with a first connector which is correspondingly mated with the second connector,
   wherein the locking slidable cover comprises a top plate and two side plates bent downwardly from two sides of the top plate respectively, a lower end of each side plate is bent to form at least one locking tab, and the locking tab extends along a front-rear direction, and
   wherein the side plate is provided with a locking protrusion protruding toward the other side plate; an outer side surface of the cover body is provided with a locking groove, and the locking groove is capable of correspondingly receiving the locking protrusion so as to keep a locked status of the locking slidable cover.

7. The second connector according to claim 6, wherein the outer side surface of the cover body is further provided with a guiding groove, the guiding groove is spaced apart from the locking groove in the front-rear direction, the guiding groove extends in the up-down direction and is capable of receiving the locking protrusion so as to allow the locking protrusion to slide up and down along the guiding groove.

8. The second connector according to claim 6, wherein the side plate is provided with a limiting hole extending along the front-rear direction; the outer side surface of the cover body is further provided with a limiting protrusion protruding outwardly, the limiting protrusion extends into the limiting hole and is capable of limiting a range of movement of the locking slidable cover in the front-rear direction.

9. An electrical connector assembly comprising:

a first connector comprising:
- an insulating housing, the insulating housing being provided with a plurality of first power cavities and at least one first signal cavity which extend in an up-down direction;
- a plurality of first power terminals correspondingly extending into the plurality of first power cavities;
- a plurality of first signal terminals and a plurality of first braking terminals provided in the first signal cavity; and
- a locking plate embedded in the insulating housing, the locking plate being provided with a locking mechanism protruding upwardly, the locking mechanism being exposed on an upper surface of the insulating housing, and the locking mechanism being used to be locked with a second connector correspondingly; and the second connector comprising:
- a terminal block provided with a plurality of second power cavities and a plurality of second signal cavities which extend in an up-down direction;
- a plurality of second power terminals correspondingly mounted in the plurality of second power cavities;
- a plurality of second signal terminals and a plurality of second braking terminals which are correspondingly mounted in the plurality of second signal cavities;
- a cover body covering the terminal block; and
- a locking slidable cover slidably mounted on the cover body, the locking slidable cover being capable of sliding forwardly and rearwardly relative to the cover body, and being capable of being locked together with the first connector which is correspondingly mated with the second connector, wherein the locking slidable cover of the second connector and the locking mechanism of the first connector are correspondingly locked together, wherein the second power terminals are electrically connected with the first power terminals correspondingly, wherein the second signal terminals are electrically connected with the first signal terminals correspondingly, wherein the second braking terminals are electrically connected with the first braking terminal correspondingly, and wherein the locking plate is made of a metal material, wherein the locking plate includes a body, the locking mechanism and at least one grounding terminal, wherein the locking mechanism protrudes upwardly from the body, wherein the body has a flat plate shape and is provided with an opening, and wherein the at least one grounding terminal is bent upwardly from a side wall of the opening of the body.

\* \* \* \* \*